United States Patent
Revach et al.

(10) Patent No.: US 10,268,505 B2
(45) Date of Patent: Apr. 23, 2019

(54) BATCH JOB FREQUENCY CONTROL

(71) Applicant: HEWLETT PACKARD ENTERPRISE DEVELOPMENT LP, Houston, TX (US)

(72) Inventors: Eli Revach, Yehud (IL); Gabriel Dayan, Yehud (IL); Avihay Mor, Yehud (IL)

(73) Assignee: ENTIT SOFTWARE, LLC, Sanford, NC (US)

( * ) Notice: Subject to any disclaimer, the term of this patent is extended or adjusted under 35 U.S.C. 154(b) by 211 days.

(21) Appl. No.: 15/141,032

(22) Filed: Apr. 28, 2016

(65) Prior Publication Data
US 2017/0317950 A1  Nov. 2, 2017

(51) Int. Cl.
G06F 15/173 (2006.01)
G06F 9/48 (2006.01)
H04L 12/24 (2006.01)
H04L 12/26 (2006.01)

(52) U.S. Cl.
CPC .......... *G06F 9/4843* (2013.01); *H04L 41/142* (2013.01); *H04L 41/16* (2013.01); *H04L 43/045* (2013.01); *H04L 43/067* (2013.01); *H04L 43/16* (2013.01)

(58) Field of Classification Search
CPC ............................. G06F 9/4843; H04L 41/00
USPC ......................................................... 709/224
See application file for complete search history.

(56) References Cited

U.S. PATENT DOCUMENTS

| | | | |
|---|---|---|---|
| 7,689,622 B2 | 3/2010 | Liu et al. | |
| 2012/0137367 A1 | 5/2012 | Dupont et al. | |
| 2014/0258197 A1 | 9/2014 | Davulcu et al. | |
| 2015/0233879 A1 | 8/2015 | Tolmie et al. | |
| 2016/0047790 A1 | 2/2016 | Gaughan et al. | |
| 2017/0123929 A1* | 5/2017 | Helleren | G06F 11/1441 |

OTHER PUBLICATIONS

Wood, William, et al., "A daily oscillation in the fundamental frequency and amplitude of harmonic syllables of zebra finch song." Plos one, Dec. 2, 2013, 12 pgs. http://www.ncbi.nlm.nih.gov/pmc/articles/PMC3846747/.

* cited by examiner

Primary Examiner — Phuoc H Nguyen

(57) ABSTRACT

According to an example, a batch processing system is to determine a cluster of related metrics. A stability of a baseline for a metric in the cluster is determined. A frequency of execution of batch jobs for calculating baselines for metrics is determined based on the stability.

20 Claims, 5 Drawing Sheets

BATCH JOB FREQUENCY CONTROL

BACKGROUND

Big data involves the processing of extremely large data sets to identify patterns, trends, and associations in the data sets. Data mining, machine learning and other techniques may be used for analysis of the data sets to determine the patterns, trends, and associations in the data sets. Also, the analysis of the data sets may be combined with business intelligence reporting for decision-making processes.

In some situations, the extremely large data sets may be periodically received, such as on a daily basis, and the analysis of the data sets may be based on metrics and thresholds that are updated periodically based on newly received data sets. Batch processes may be executed to periodically update the thresholds and to perform other calculations and operations based on the metrics for analyzing the data sets.

BRIEF DESCRIPTION OF THE DRAWINGS

Features of the present disclosure are illustrated by way of example and not limited in the following figure(s), in which like numerals indicate like elements, and in which.

DETAILED DESCRIPTION

Figure 1:
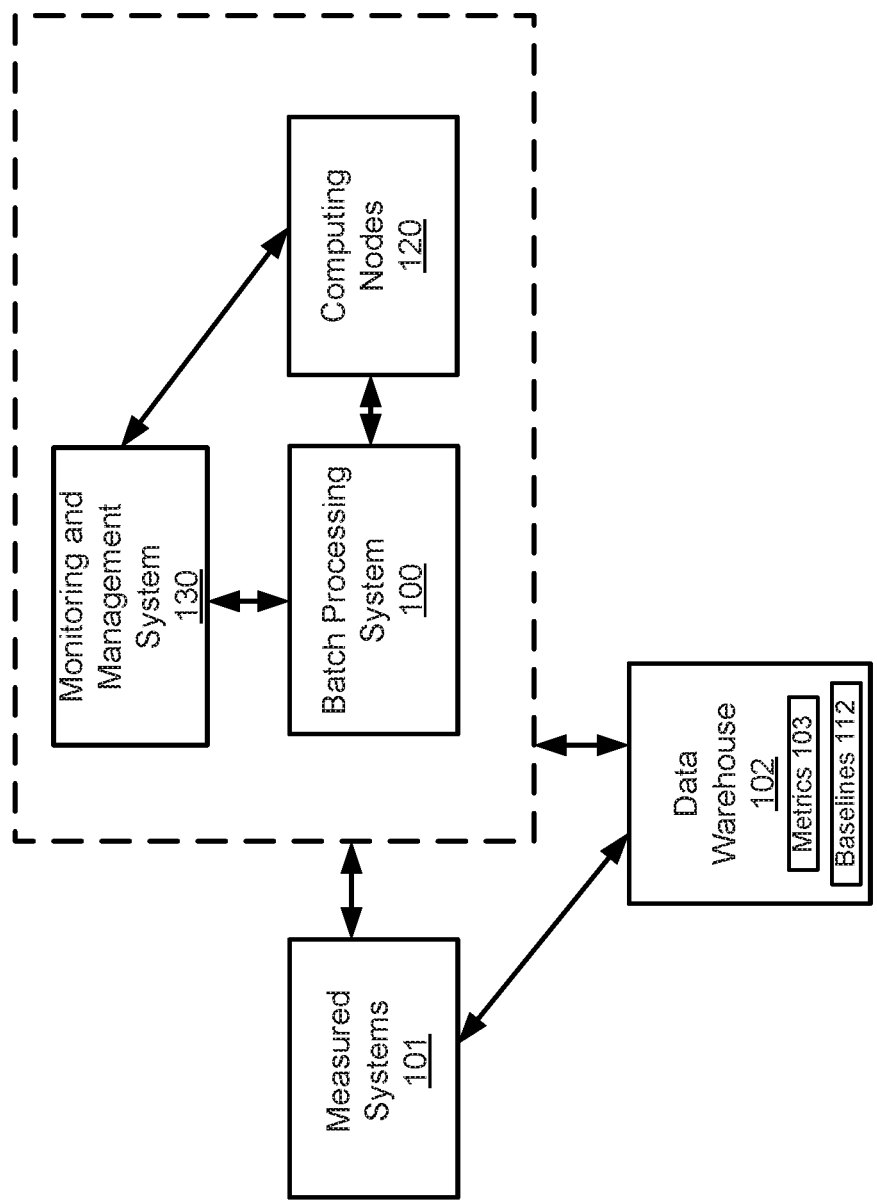
FIG. 1 shows a batch processing system interfacing with other systems, according to an example of the present disclosure.

For simplicity and illustrative purposes, the present disclosure is described by referring mainly to an example thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. In the present disclosure, the term "includes" means includes but not limited thereto, the term "including" means including but not limited thereto. The term "based on" means based at least in part on. In addition, the terms "a" and "an" are intended to denote at least one of a particular element.

According to an example of the present disclosure, a batch processing system may control the frequency of performing batch processing based on an analysis of metrics. Batch processing may include execution of a computer program or multiple computer programs on multiple inputs (e.g., a batch of inputs). The inputs may include data sets, which may include time-series data. Batch processes may be scheduled, and may execute at the scheduled time without human interaction. Often, batch processing is performed on large data sets and/or where a fast response time is not critical, and the data sets to be processed may be gathered over a period of time, and then sent together as a batch for batch processing. Batch processes may include batch jobs. The batch jobs may be combined and executed as a batch process. In an example, a batch job may include execution of a series of processing operations by a computer program or multiple computer programs on a data set. For example, a batch job may include a series of processing steps to calculate a baseline for a metric.

In an example of the present disclosure, the batch processing system may control a frequency of execution of batch jobs for determining baselines for metrics. Metrics may include measured values. The metrics may include time-series metrics that include measurements over time. For example, an information technology (IT) system, including servers, network devices, storage devices, etc., may be monitored to capture metrics continuously or periodically, and to detect potential hardware failures, service level failures, etc., based on the captured metrics. Metrics may include measured values for central processing unit (CPU) usage, memory usage, storage device usage, application response times, and/or other metrics. The batch processing system may receive data sets of captured metrics and calculate a baseline for each of the metrics based on historic data and newly received data for the metrics. If a metric, such as a utilization metric, exceeds a baseline or falls outside a variance band that represents the baseline, an alert reporting a potential abnormality on the IT system may be generated and sent to the appropriate system administrator, and corrective actions may be performed, such as replacing hardware, re-balancing server workloads, etc. Metrics other than IT metrics may be provided to the batch processing system.

In an example, a metric may include a dimension, a time and a value. A dimension may include one of a group of properties or an attribute of what is being measured. Time may specify when the metric was measured. Value may be the measured value for the metric. For example, a dimension may be a host name of a server, and the value may be a measured CPU utilization, and the time may be a timestamp indicating when the CPU utilization was measured.

A baseline may include a benchmark or threshold that is used for comparing current and past values. In an example, the baseline may include a variance band or sleeve that represents a majority of values for a metric. Accordingly, the baseline may include a range of values. Mean and standard deviation are a statistical ways of estimating the normal behavior of a metric and for determining the baseline. In an example, the baseline is calculated using a coefficient of + or −3 times the standard deviation from a metric's mean value. A different coefficient may be used for different metrics. Creating a baseline may enable learning the normal performance of applications or devices measured by performance metrics. Knowing how an application or device typically performs can allow determination of whether a performance problem is an isolated incident or a sign of a trend.

A batch process may include batch jobs, which are periodically executed to calculate baselines for metrics. For example, a batch job may be executed for each metric to calculate its baseline. There may be hundreds or even thousands of metrics so the execution of batch processes, including batch jobs for calculating baselines for the metrics, may heavily utilize computing resources. Furthermore, the baselines may be updated as new data sets are captured (e.g., measured or derived) for the metrics. New data sets may be captured hourly, daily, etc., and thus, the batch jobs may be frequently executed. The batch processing system may control the frequency of execution of the batch jobs to minimize use of computing resources. According to an example of the present disclosure, the batch processing system may control the frequency of execution of batch jobs based on evaluation of metrics as a cluster, and based on stability of a metric in the cluster.

FIG. 1 illustrates batch processing system 100 interfacing with multiple systems to execute batch processes. Metrics 103 are collected for measured systems 101. In an example, the measured systems 101 include an information technology (IT) system including servers, network devices, storage devices, virtual machines, applications executed by the servers and virtual machines, etc. Metrics for these computers, devices and applications may be measured and stored in data warehouse 102. For example, the metrics 103 may include central processing unit (CPU) usage, memory usage, storage device usage, application response times, and/or other metrics.

The batch processing system 100 may calculate baselines 112 for the metrics 103. For example, the batch processing system 100 may retrieve the metrics 103 from the data warehouse 102 to calculate the baselines 112. The baselines 112 may be stored in the data warehouse 102. The metrics 103 may be periodically or constantly measured, so newly measured values for the metrics 103 are periodically or constantly determined and stored. Accordingly, the baselines 112 for the metrics 103 may be periodically updated based on newly measured values for the metrics 103 and historic data for the metrics 103. The batch processing system 100 may control the frequency for calculating the baselines 112 and thus control the frequency of execution of batch jobs for calculating the baselines 112. The frequency may be initially set based on the frequency for receiving or accumulating data sets of newly measured values for the metrics 103. As is further discussed below, the batch processing system 100 may reduce the frequency for calculating baselines based on clustering of the metrics and stability of the baselines determined over time.

Monitoring and management system 130 may evaluate the performance of the measured systems 101 based on the baselines 112 and the metrics 103. For example, the monitoring and management system 130 may compare the metrics 103 to the baselines 112 to detect when the metrics 103 fall outside of tolerance and may implement processes in response to the detection. For example, alerts may be generated or automated processes may be invoked. In the example of the measured systems 101 comprising an IT system, alerts may be generated and sent to the appropriate system administrator managing a server or device or application for which a metric is out of tolerance. Automated processes may be invoked. For example, a back-up server may be provisioned if an imminent failure of a server is predicted based on the measured metrics for the server. In another example, workloads for servers or virtual machines or data storage devices may be re-balanced if utilization is out of tolerance.

The monitoring and management system 130 and the batch processing system 100 may be part of the same system or may be two independent systems that share information. The batch processing system 100 may send the baselines 112 to the monitoring and management system 130 or the monitoring and management system 130 may retrieve the baselines 112 from the data warehouse 102. The data warehouse 102 may include any suitable data storage system for storing data for the metrics 103 and may store any other data that may be used by the monitoring and management system 130 and the batch processing system 100.

According to an example, the batch processing system 100 may utilize computing nodes 120 to calculate the baselines 112. The computing nodes 120 may include servers or other types of computers. The computing nodes 120 may also be used by the monitoring and management system 130 to compare the metrics 103 to the baselines 112 and perform other functions and operations. The batch processing system 100 may minimize the workload of the computing nodes 120 by reducing the frequency of calculating of the baselines 112. This can free up the computing nodes 120 to perform other operations, which in turn may improve the performance of other systems or software applications that may be executed by the computing nodes 120.

Figure 2:
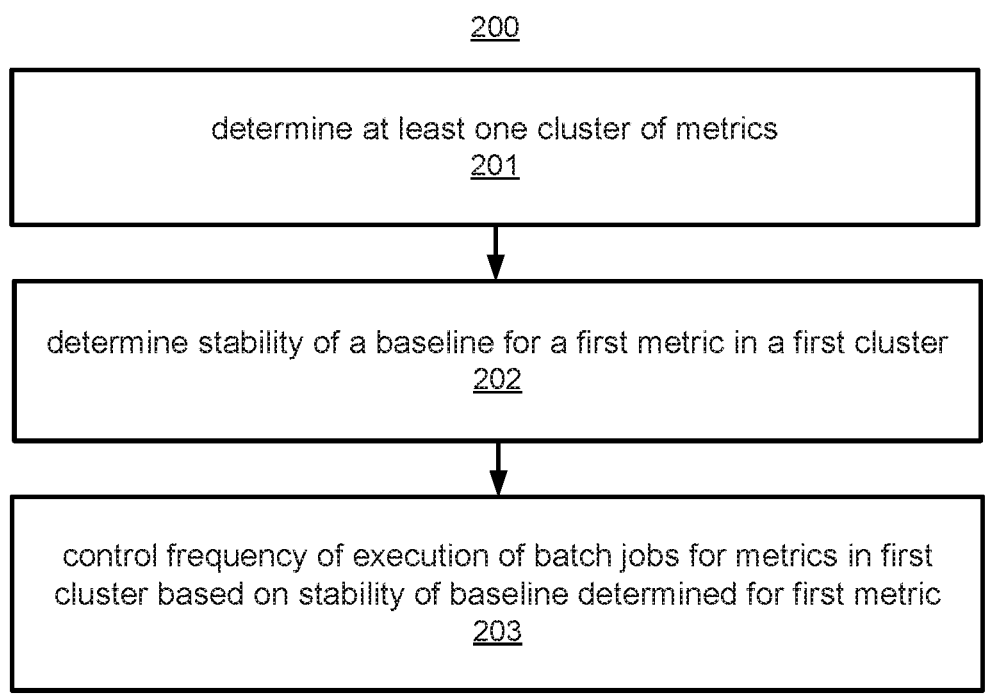
FIG. 2 shows a method for controlling a frequency for a batch job, according to an example of the present disclosure.

FIG. 2 illustrates a method 200 for controlling a frequency for calculating a baseline for a metric and checking the baseline's stability, according to an example. The method 200 is described by way of example as being performed by the batch processing system 100, but may be performed by other systems. At 201, the batch processing system 100 determines a cluster or multiple clusters of the metrics 103. A cluster is a group of related metrics. For example, the metrics 103 may be clustered according to a correlation of the metrics 103. The correlation may be a measure of statistical relationship between two or more of the metrics 103. Metrics that are determined to be correlated are placed in the same cluster. Multiple clusters of metrics may be determined for the metrics 103.

In an example, clustering may be performed based on relationships between metrics. For example, the extent of linear relationship between two metrics determines whether the metrics are placed in the same cluster. The Pearson product-moment correlation coefficient (also referred to as the Pearson correlation coefficient) is a measure of the strength of a linear association between two variables and may be used to determine whether metrics are correlated and placed in the same cluster. For example, the Pearson correlation coefficient is between +1 and −1 inclusive, where 1 is total positive correlation, 0 is no correlation, and −1 is total negative correlation. For example, metrics with a Pearson correlation coefficient close to +1, such as within a predetermined range up to an including +1, may be placed in the same cluster.

In other examples for determining the clusters, user-defined or inferred attributes, also referred to as dimensions, may be used to determine clusters. For example, the measured systems 101 may include IT components, such as servers. The servers have attributes, such as host name, IP address, subnets, etc. A user-defined attribute may be host name. If metrics, such as CPU utilization, memory utilization, etc., are collected for the same server, the metrics may be associated with the same host name. The metrics associated with the same host name are put in the same cluster. In another example, relationships may be inferred. For example, logs for servers may be compared to determine whether the servers have similar workloads. Metrics for servers having similar workloads are put in the same cluster.

At 202, the batch processing system 100 determines stability of a baseline for a first metric in a first cluster of the clusters determined at 201. The metric currently being evaluated may be referred to as the "first" metric to distinguish from other metrics in the cluster. "First" does not mean that the metrics in a cluster are in any particular order. Instead, "first" is used to represent any metric whose baseline is currently being analyzed for stability by the batch processing system 100. Similarly, the cluster of the first metric may be referred to as the first cluster to distinguish from other clusters determined at 201.

Stability may be determined based on an amount of change in the baseline determined over time. If the current baseline is similar to a baseline for one or multiple previous calculations, then the baseline is considered stable; otherwise it is considered unstable. In an example, similar may include within a predetermined number of standard deviations of a mean. The metrics may include time series data, and the baselines are periodically calculated according to the frequency determined by the adaptive batch processing system. For each iteration of the baseline calculation, the baseline calculation uses the most recent data for the metric and may also use historic data for the metric. The current baseline refers to the most recent calculation of the baseline, and a previous baseline or a previously calculated baseline refers to a baseline calculated in a previous iteration. For example, assume the baseline is calculated hourly, and new data for the first metric may be received hourly in a data set. Assume it is 6 AM or between 6 AM and 7 AM. The current baseline may be calculated using the 6 AM data set for the first metric, and the previous baseline may have been calculated using the 5 AM data set for the first metric. Historic data for the first metric may also be used to determine the baseline.

In an example, the baseline may include a variance band or sleeve that represents a majority of values for a metric. Accordingly, the baseline may include a range of values. Mean and standard deviation are statistical ways of estimating the baseline. An example of a baseline comprising a sleeve is shown at 501 in FIG. 5. The sleeve for example represents a standard deviation from the mean over time for the metric. The sleeve 501 is represented by the hashed values for the metric shown in FIG. 5, and the values for the metric outside of the sleeve 501 are outliers from the sleeve, which are labeled at 503. As is shown the metric is a time series metric. The metric may include CPU utilization for a server captured in log files.

The baseline may be calculated for each metric in each cluster periodically, such as according to a frequency determined by the batch processing system 100, and stability may be determined for each baseline in each iteration. In an example, a difference between the current and a previous baseline that exceeds a predetermined threshold may result in the baseline being considered unstable; otherwise the baseline is considered to be stable. In an example, if the current baseline is greater than or equal to + or −3 times (or some other multiple) the standard deviation from the baseline's mean, it is considered unstable; otherwise the baseline is considered to be stable. Trend may also be used to determine stability.

Figure 5:
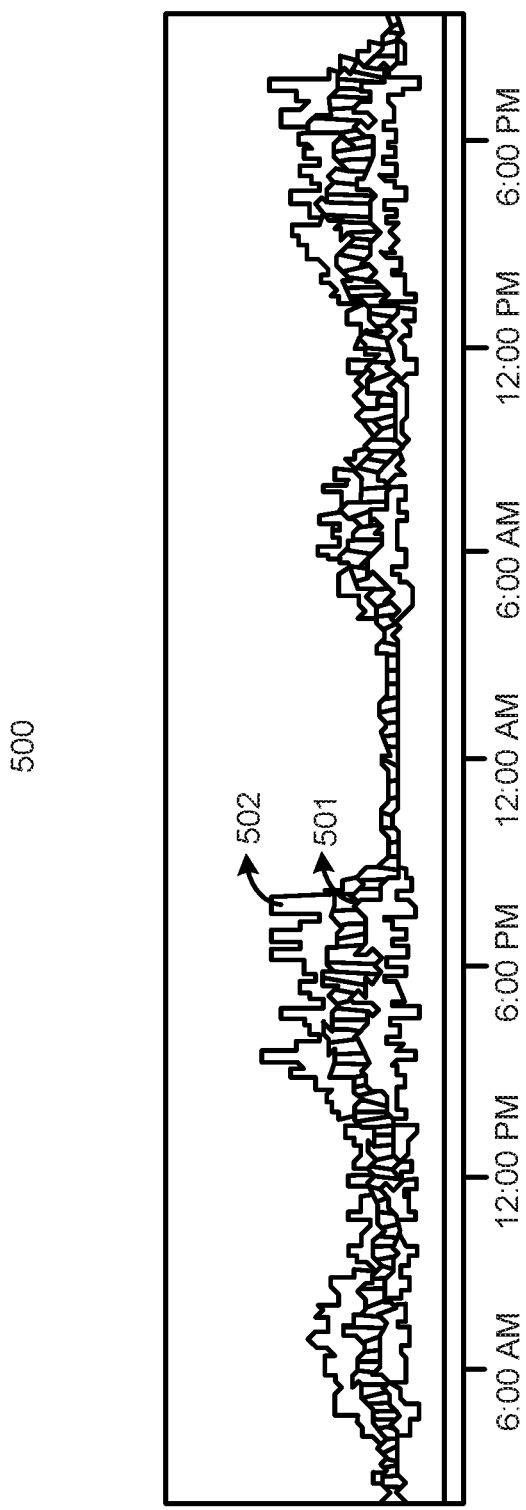
FIG. 5 shows a baseline sleeve, according to an example of the present disclosure.

Also, seasonality may be determined for a metric to determine whether the baseline for the metric is stable. When a repeated pattern at constant time intervals occurs, a metric has seasonality. For example, a metric for CPU utilization for a server might have typical values for overnight times, such as between 2 AM and 4 AM (e.g., a typical low CPU utilization each day for this time interval such as shown in FIG. 5). That metric has a season of length 2 hours for the time period between 2 AM and 4 AM. For a baseline with seasonality, season length, season trend and season buckets are compared to determine stability. For example, if the season length is determined to be the same for a current calculation of the baseline and a previous calculation of the baseline, the mean and standard deviation between the buckets are compared to determined stability. A bucket is a time slice in the season. For example, a bucket may be every minute or every ten minutes. Also, a correlation, such as a Pearson correlation coefficient, between buckets may be used to determine stability. If the season length is determined to be different for a current calculation of the baseline and a previous calculation of the baseline, then the buckets of the seasons may not be compared for determining stability. Instead, stability may be determined as discussed above.

At 203, the batch processing system 100 may control a frequency of execution of batch jobs for metrics in the first cluster based on the stability of the baseline determined for the first metric. In an example, the frequency of execution of a batch job for calculating a baseline of the first metric in the first cluster may be reduced from a second frequency to a first frequency if the baseline is stable. The second frequency may be any frequency above the first frequency. The second frequency may be based on factors such as how recent the data for the metric is updated. In an example, the second frequency is every hour, and the first frequency is every 12 hours. Of course other frequencies may be used for the first and second frequencies. As is further discussed below, the frequency of execution of batch jobs for other metrics, in addition to the first metric, in the same cluster (e.g., the first cluster) may also be reduced if the first metric is determined to be stable. For example, if the first metric in the first cluster is determined to be stable, all metrics except a proxy metric in the cluster may be reduced or all metrics may be reduced if there is sufficient coverage for checking stability by staggering when baselines for other metrics in the first cluster are checked for stability. Also, the frequency of execution of the batch job for calculating the baseline for the metric may not be reduced, and may be maintained or set to the second frequency, if the baseline is determined to be unstable.

The method 200 may be repeated according to the frequency set by the batch processing system 100. The method 200 may be performed for each metric in each cluster, and may be repeated for each metric in each cluster. Each iteration of the method 200, including calculating the baseline and checking the stability, may be performed as a batch job. For example, once the frequency is set, the batch job may be performed according to the frequency. Accordingly, controlling the baseline calculation frequency controls the frequency of execution of the batch job or vice versa.

Figure 3:
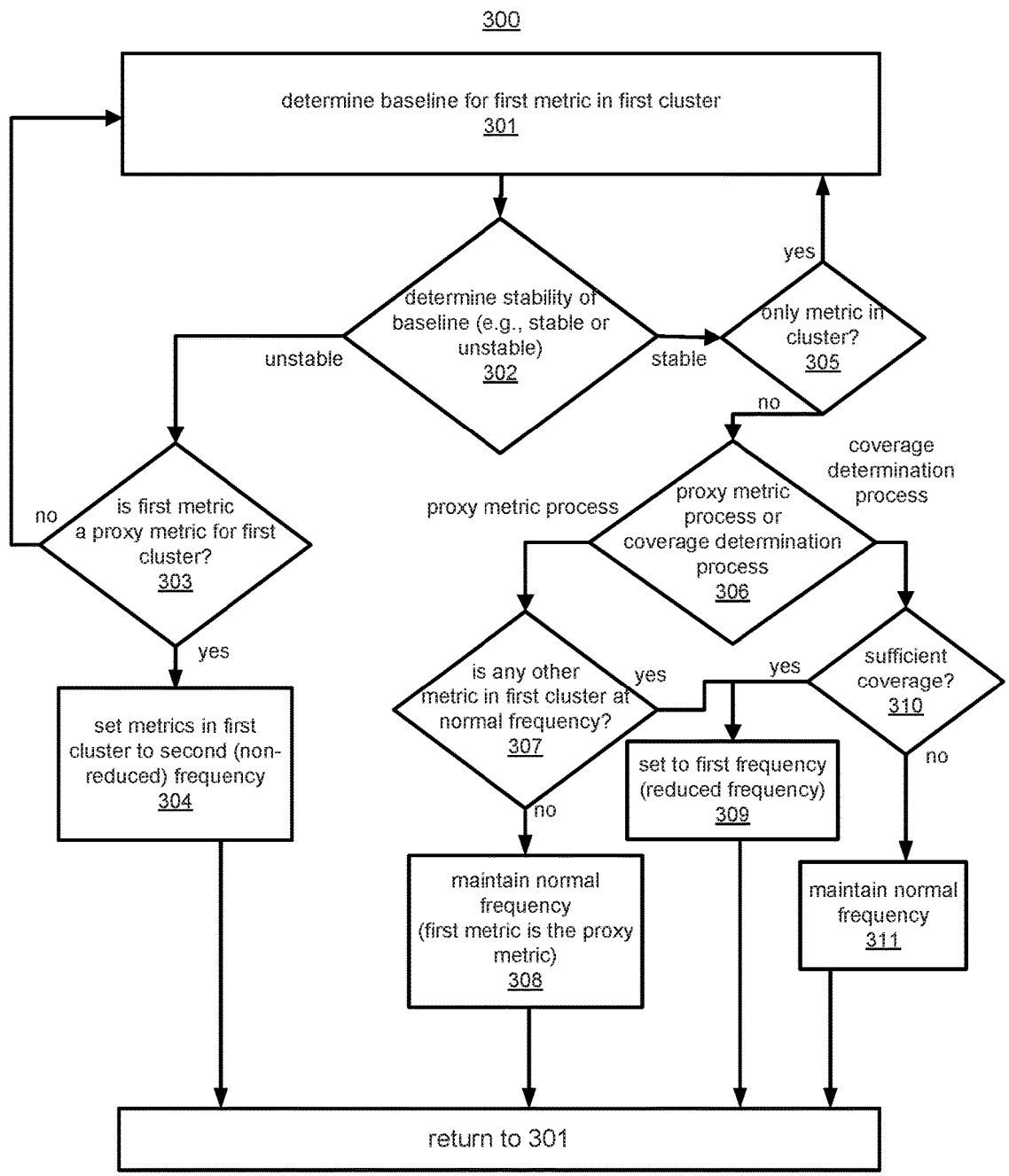
FIG. 3 shows a method for controlling a frequency for a batch job, according to another example of the present disclosure.

FIG. 3 illustrates a method 300 for controlling a frequency for calculating a baseline for a metric and checking the baseline's stability, according to an example. The frequency for performing the batch job for a metric may be set at the frequency for calculating its baseline. The batch job may perform the operations of the method 300 for the metric. The method 300 is described by way of example as being performed by the batch processing system 100, but may be performed by other systems. The method 300 includes operations that may be operations of the method 200 and/or sub-operations of operations of the method 200.

Clusters of the metrics 103 are determined for example as discussed above with respect to 201. At 301, a baseline for a metric, referred to as the first metric, in one of the clusters is determined. The cluster of the first metric may be referred to as the first cluster. The baseline may be calculated from historic data and most recent data received for the first metric. The baseline calculated at 301 may be referred to as the current baseline because it is calculated using the most recent data received for the first metric. In an example, the baseline may be calculated based on standard deviation and may include a sleeve such as shown in FIG. 5.

At 302, stability of the baseline is determined. Determining stability may include determining whether the baseline is stable or unstable by comparing the current baseline to a previously calculated baseline or multiple baselines previously calculated for the first metric. Examples of determining stability are described above with respect to 202.

If the baseline is determined to be unstable, then a determination is made as to whether the first metric is a proxy metric for the first cluster at 303. The proxy metric may be a metric for a cluster whose behavior, such as baseline stability, is imparted on other metrics in the cluster. For example, if the baseline for the proxy metric is determined to be unstable then the baseline for the other metrics in the same cluster is also assumed to be unstable. The frequency of execution of the baseline for the proxy metric may be varied between multiple frequencies. The frequency of execution of the baseline may be maintained at a second frequency higher than a first frequency (also referred to as a reduced frequency) so it is monitored more frequently while the other metrics may be kept at the first frequency, i.e., the reduced frequency. If the baseline for the proxy metric is determined to be unstable, then the baseline calculations for the other metrics may be set to the second frequency.

In an example, to determine whether the first metric is the proxy metric for the first cluster at 303, the frequency of execution of the baseline for any of the other metrics is determined. For example, the current frequency of execution of the baseline for each metric of the first cluster is stored and is updated if it changes. If the frequency of execution of the baseline for any of the other metrics of the first cluster is at the first frequency (i.e., the reduced frequency), then the first metric is considered to be the proxy metric. If the first metric is determined to be the proxy metric and its baseline is unstable, then the baseline calculation frequency for the other metrics in the first cluster is set to the second frequency at 304. If at 303, the first metric is determined not to be the proxy metric, the baseline calculation frequency for the first metric is maintained at its current frequency and the method 300 may be repeated, starting at 301, at the next interval, such as the next hour if the baseline calculation frequency is currently hourly.

If, at 302, the baseline is determined to be stable, the baseline calculation frequency for the first metric may or may not be reduced. In an example, the batch processing system 100 may be able to execute a proxy metric process or a coverage determination process to determine whether to reduce the baseline calculation frequency. It may be predetermined that particular metrics utilize the proxy metric process and particular metrics utilize the coverage determination process.

At 305, a determination is made as to whether there is more than one metric in the first cluster. If there is not more than one metric, the baseline calculation frequency for the first metric is maintained. Then, the baseline calculation frequency for the first metric may be repeated, starting at 301, at the next interval, such as the next hour if the baseline calculation frequency is currently hourly. If there is more than one metric, at 306, a determination is made as to whether the metric is assigned to the proxy metric process or the coverage determination process. Each cluster of metrics may be pre-assigned to the proxy metric process or the coverage determination process. In an example, a user may pre-assign the clusters to the proxy metric process or the coverage determination process.

If the first cluster is assigned to the proxy metric process, a determination is made as to whether the first metric is the proxy metric for the first cluster. To determine whether the first metric is the proxy metric for the first cluster, a determination is made as to whether the baseline calculation frequency for any other metrics in the first cluster is at the second frequency at 307. If the baseline calculation frequency for at least one other metric in the first cluster is at the second frequency, it is assumed that the first metric is not the proxy metric for the first cluster, and the baseline calculation frequency for the first metric is set to the first frequency (i.e., the reduced frequency) at 309. Then, the method 300 may be repeated, starting at 301, at the next interval, such as in the next six hours if the first frequency is every six hours. If none of the baseline calculation frequencies for the other metrics in the first cluster are at the second frequency, it is assumed that the first metric is the proxy metric for the first cluster, and the baseline calculation frequency for the first metric is set or maintained at the second frequency at 308. Then, the method 300 may be repeated, starting at 301, at the next interval, such as the next hour if the second frequency is hourly.

If the first metric is assigned to the coverage determination process, then the baseline calculation frequency for the first metric may be reduced if there is sufficient coverage for intervals between the second frequency and the reduced frequency at 310. For example, the times for calculating the baselines for metrics in a cluster may be staggered. Intervals between the first frequency and the second frequency are determined. For example, the intervals may be hourly. A determination is made as to whether the stability of at least one metric in the first cluster is tested, e.g., determined by the batch processing system 100, for each interval to determine whether there is sufficient coverage at 310 to allow reducing the baseline calculation frequency of the first metric at 309. This is further illustrated by the examples described below.

In an example, assume the second frequency is every hour and the first frequency is every six hours. Assume, for this example, that the first cluster includes metrics M1-M5. Also, assume the current time is 6 AM and the baseline is currently calculated hourly for M1. The batch processing system 100 may keep track of the times when the baseline is calculated for each metric M1-M5 in the first cluster, such as in a table or in any suitable data structure.

Table 1 below shows an example of when baseline calculations may be performed for metrics M1-M5 in the first cluster. Times are shown 6 AM-12 PM, however, the baseline calculations for each of the metrics M1-M5 are periodically calculated according to their frequencies.

TABLE 1

| 6AM | 7AM | 8AM | 9AM | 10AM | 11AM | 12PM |
|-----|-----|-----|-----|------|------|------|
| M1  | M1  | M1  | M1  | M1   | M1   | M1   |
| M2  |     |     |     |      |      | M2   |
|     | M3  | M5  |     | M4   |      |      |

In table 1, M1 currently has a baseline calculation frequency of every hour, and M2-M5 currently have baseline calculation frequencies of every six hours. Although not shown, the next baseline calculation for M3 is 1 PM; the next baseline calculation for M4 is 4 PM; and the next baseline calculation for M5 is 2 PM. Accordingly, the times when the baseline calculations are performed may be staggered even if metrics have the same baseline calculation frequencies.

Assume, for this example that no metrics other than M1-M5 are in the first cluster. If M1 is reduced to the first frequency of every six hours, then no baseline calculation is performed for the metrics of the first cluster for 9 AM and 11 AM, such as shown in table 2 below.

TABLE 2

| 6AM | 7AM | 8AM | 9AM | 10AM | 11AM | 12PM |
|-----|-----|-----|-----|------|------|------|
| M1  |     |     |     |      |      | M1   |
| M2  |     |     |     |      |      | M2   |
|     |     | M3  | M5  |      | M4   |      |

If the baseline calculation frequency for at least one metric in the first cluster is to be tested every hour for sufficient coverage at 310, then there is insufficient coverage if the baseline calculation frequency of M1 is reduced to every six hours. Thus, the baseline calculation frequency of M1 is not reduced in this example, and at 311, the baseline calculation frequency of M1 is maintained at every hour, such as shown in table 1.

Assume that the first cluster includes additional metrics M6 and M7 that currently have a baseline calculation frequency of every six hours. Assume, M6 is measured at 9 AM and every six hours after 9 AM, and M7 is measured at 11 AM and every six hours after 11 AM. Then, as shown in table 3, even if the baseline calculation frequency of M1 is reduced to every six hours, the baseline of at least one metric of the first cluster is still being calculated every hour. Accordingly, the baseline calculation frequency of M1 may be reduced to every six hours at 309.

TABLE 3

| 6AM | 7AM | 8AM | 9AM | 10AM | 11AM | 12PM |
|-----|-----|-----|-----|------|------|------|
| M1  |     |     |     |      |      | M1   |
| M2  |     |     |     |      |      | M2   |
|     |     | M3  | M5  |      | M4   |      |
|     |     |     |     | M6   |      |      |
|     |     |     |     |      | M7   |      |

The method 300 may be repeated according to the frequency set by the batch processing system 100 for calculating the baseline and checking the stability. For example, after 304, 308, 309, 311, and after 303 if the determination is no, calculating the baseline and checking the stability is repeated according to the set or maintained frequency. The method 300 may be performed for each metric in each cluster, and may be repeated for each metric in each cluster. Each iteration of the method 300, including calculating the baseline and checking the stability, may be performed as a batch job. For example, once the baseline calculation frequency is set, the batch job may be performed according to the frequency. Accordingly, controlling the baseline calculation frequency controls the frequency of execution of the batch job.

Figure 4:
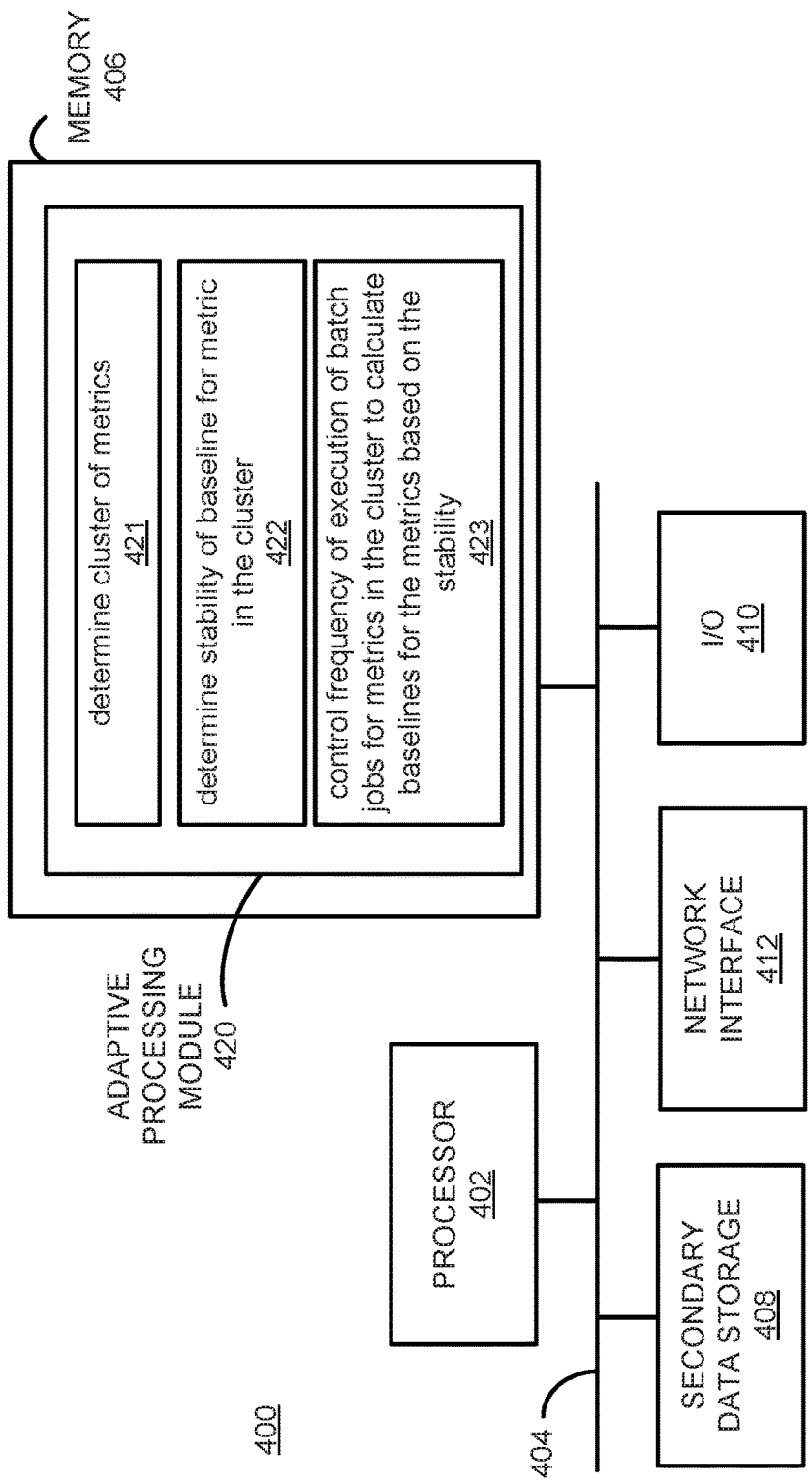
FIG. 4 shows a computer platform for the batch processing system, according to an example of the present disclosure.

FIG. 4 shows a computer system 400 that may be used with the examples described herein. The computer system 400 may represent a platform that includes components that may be in a server or another computer system. The computer system 400 may be used as a platform for the batch processing system 100. The computer system 400 may execute, by a processor (e.g., a single or multiple processors) or other hardware processing circuit, the methods, functions and other processes described herein. These methods, functions and other processes may be embodied as machine readable instructions stored on a non-transitory computer readable medium, such as hardware storage devices (e.g., RAM, ROM, EPROM, EEPROM, hard drives, and flash memory). Commands and data from the processor 402 may be communicated over a communication bus 404. The computer system may also include a main memory 406, such as a random access memory, where the machine readable instructions and data for the processor 402 may reside during runtime, and a secondary data storage 408, which may be non-volatile and stores machine readable instructions and data. The memory and data storage are examples of computer readable media. An adaptive batch processing module 420 may include machine readable instructions residing in the memory 406 during runtime and executed by the processor 402 to perform the functions and operations of the provisioning management system 100. Examples of the machine readable instructions for the batch processing module 420 which may be executed by the processor 402 are shown at 421-423. At 421, the processor 402 may determine a cluster of metrics. At 422, the processor 402 may determine stability of a baseline for a metric in the cluster based on an amount of change in the baseline determined over time. At 423, the processor 402 may control a frequency of execution of batch jobs for metrics in the cluster to calculate baselines for the metrics in the cluster based on the stability. To control the frequency based on the stability, the processor 402 may reduce the frequency of execution of the batch job for the metric to a first frequency lower than a second frequency or maintain the frequency at the second frequency The computer system 400 may include an I/O device 410, such as a keyboard, a mouse, a display, etc. The computer system may include a network interface 412 for connecting to a network. Other known electronic components may be added or substituted in the computer system.

What has been described and illustrated herein are examples of the disclosure along with some variations. The terms, descriptions and figures used herein are set forth by way of illustration and are not meant as limitations. Many variations are possible within the scope of the disclosure, which is intended to be defined by the following claims, and their equivalents, in which all terms are meant in their broadest reasonable sense unless otherwise indicated.

What is claimed is:

1. A batch processing system comprising:
    a non-transitory computer readable medium storing machine readable instructions; and
    a processor, wherein the processor is to execute the machine readable instructions to:
        determine clusters of metrics in a plurality of metrics, wherein the plurality of metrics measure characteristics of a plurality of computing components in an information technology (IT) system;
        determine stability of a baseline for a first metric in a first cluster of the clusters based on an amount of change in the baseline determined over time; and
        execution of execute batch jobs for metrics in the first cluster with a frequency based on the stability of the baseline for the first metric, wherein the batch jobs are executed to calculate baselines of the metrics in the cluster.

2. The batch processing system of claim 1, wherein the processor is to:
    in response to determining the baseline is unstable based on the determined stability, for each of the metrics in the first cluster that have the frequency of execution of the batch job currently at a first frequency lower than a second frequency, increase the frequency of execution of the batch job for the first metric to the second frequency.

3. The batch processing system of claim 1, wherein the processor is to:
    in response to determining the baseline for the first metric is stable based on the determined stability and in response to determining that there is a plurality of metrics in the first cluster, determine whether first metric in the first cluster is a proxy metric for the first cluster;
in response to determining the first metric is not the proxy metric, maintain the frequency of execution of the batch job for the first metric; and
in response to determining the first metric is the proxy metric, set the frequency of execution of the batch job for each of the other metrics in the first cluster to the second frequency.

4. The batch processing system of claim 3, wherein to determine whether the first metric is the proxy metric, the processor is to:
determine whether any of the other metrics in the first cluster have the frequency of execution of the batch job at the first frequency, and the first metric has the frequency of execution of the batch job at the second frequency.

5. The batch processing system of claim 1, wherein the processor is to:
in response to determining the baseline for the first metric is stable based on the determined stability and in response to determining that there is a plurality of metrics in the first cluster, determine a reduced frequency of execution of the batch job for the first metric that is lower than a second frequency of execution of the batch job for the first metric;
determine intervals between the reduced frequency and the second frequency;
determine whether stability of a metric in the first cluster is tested by the batch processing system for each of the intervals;
in response to determining stability of a metric in the first cluster is tested for each of the intervals, set the frequency of execution of the batch job for the first metric to the reduced frequency; and
in response to determining stability of a metric in the first cluster is not tested for at least one of the intervals, maintain or set the frequency of execution of the batch job for the first metric at the second frequency.

6. The batch processing system of claim 1, wherein to determine stability, the processor is to:
determine whether an amount of change of the baseline between a current measure of the baseline and a previous measure of the baseline exceeds a threshold.

7. The batch processing system of claim 6, wherein the threshold is based on at least one of a mean, a standard deviation, and a trend of the baseline determined over time.

8. The batch processing system of claim 6, wherein the processor is to:
determine whether the baseline has seasonality;
in response to the baseline having seasonality, determine whether a length of a season for the baseline has changed since a previous determination of the baseline;
in response to the length not changing, compare baseline values for time slices in the season to determine the stability.

9. The batch processing system of claim 1, wherein to determine clusters of related metrics, the processor is to:
determine a correlation between data points of a plurality of metrics measured over time; and
cluster the plurality of metrics to determine the clusters based on the correlations.

10. The batch processing system of claim 9, wherein the data points that are correlated are outliers for the baselines of the plurality of metrics.

11. The batch processing system of claim 1, wherein the related metrics in the clusters are associated with computers in a network, and to determine the clusters of related the metrics, the processor is to:
determine the clusters based on attributes of the computers.

12. A processor-implemented method comprising:
determining, by a processor, at least one cluster of related metrics from a plurality of metrics, wherein the plurality of metrics measure characteristics of a plurality of computing components in an information technology (IT) system;
determining, by the processor, stability of a baseline for a metric in the at least one cluster; and
executing batch jobs for metrics in the at least one cluster to calculate baselines for the metrics in the at least one cluster based on the stability, wherein a frequency of executing the batch jobs is based on the stability of the baseline for the metric.

13. The method of claim 12, comprising:
in response to determining the baseline for the metric is stable based on the determined stability,
determining whether the metric is a proxy metric for the at least one cluster;
in response to determining the first metric is not the proxy metric, maintaining the frequency of execution of the batch job for the metric; and
in response to determining the first metric is the proxy metric, setting the frequency of execution of the batch job for any other metric in the at least one cluster to a second frequency.

14. The method of claim 12, comprising:
in response to determining the baseline for the metric is stable based on the determined stability,
determining a reduced frequency of execution of the batch job for the metric that is lower than a second frequency of execution of the batch job for the metric;
determining intervals between the reduced frequency and the second frequency;
determining whether stability of a metric in the at least one cluster is tested by the batch processing system for each of the intervals;
in response to determining stability of a metric in the at least one cluster is tested for each of the intervals, setting the frequency of execution of the batch job for the metric to the reduced frequency; and
in response to determining stability of a metric in the at least one cluster is not tested for at least one of the intervals, maintaining the frequency of execution of the batch job for the metric to the second frequency.

15. A non-transitory computer readable medium storing machine readable instructions executable by a processor to:
determine a cluster of metrics in a plurality of metrics, wherein the plurality of metrics measure characteristics of a plurality of computing components in an information technology (IT) system;
determine stability of a baseline for a metric in the cluster based on an amount of change in the baseline determined over time; and
execute batch jobs for metrics in the cluster to calculate baselines for the metrics in the cluster based on the stability, wherein a frequency of execution of the batch jobs is based on the stability of the baseline for the metric in the cluster.

16. The non-transitory computer readable medium of claim 15, wherein to determine the stability, the instructions are executable by the processor to:

determine whether an amount of change of the baseline between a current measure of the baseline and a previous measure of the baseline exceeds a threshold.

17. The non-transitory computer readable medium of claim 16, wherein the threshold is based on at least one of a mean, a standard deviation, and a trend of the baseline determined over time.

18. The non-transitory computer readable medium of claim 16, wherein the instructions are executable by the processor to:
   in response to a determination that the baseline has seasonality, determine whether a length of a season for the baseline has changed since a previous determination of the baseline;
   in response to a determination that the length has not changed since the previous determination of the baseline, compare baseline values for time slices in the season to determine the stability.

19. The non-transitory computer readable medium of claim 15, wherein to determine clusters of related metrics, the instructions are executable by the processor to:
   determine a correlation between data points of a plurality of metrics measured over time; and
   cluster the plurality of metrics to determine the cluster based on the correlations.

20. The non-transitory computer readable medium of claim 19, wherein the data points that are correlated are outliers for the baselines of the plurality of metrics.

* * * * *